CONCRETE MIX TRANSFER APPARATUS

Original Filed Jan. 22, 1963 3 Sheets-Sheet 1

CONCRETE MIX TRANSFER APPARATUS

Original Filed Jan. 22, 1963 3 Sheets-Sheet 3

Inventor:
Robert Foster Oury.
By Pepper Hamilton Scheetz & Clement
Atty's.

CONCRETE MIX TRANSFER APPARATUS

Original Filed Jan. 22, 1963 3 Sheets-Sheet 3

Inventor:
Robert Foster Oury
By Byron Hunn Brown & Clement
Attys

United States Patent Office

Re. 26,347
Reissued Feb. 20, 1968

26,347

CONCRETE MIX TRANSFER APPARATUS

Robert F. Oury, Wayne, Ill., assignor to Oury Engineering Company, Wheaton, Ill., a corporation of Illinois Original No. 3,171,534, dated Mar. 2, 1965, Ser. No. 253,184, Jan. 22, 1963. Application for reissue Aug. 5, 1966, Ser. No. 574,268
10 Claims. (Cl. 198—84)

Matter enclosed in heavy brackets [ ] appears in the original patent but forms no part of this reissue specification; matter printed in italics indicates the additions made by reissue.

My invention relates to a transfer apparatus for concrete mix from one conveyor to another where a plurality of conveyors is used for transporting and handling concrete mix in accordance with application Ser. No. 111,427, filed May 18, 1961, now Patent No. 3,151,732, of which this application is a continuation-in-part.

The primary object of my invention is to provide means for an even flow and transfer of concrete mix in a stream from the head or discharge end of one conveyor onto the tail or receiving end of an adjacent conveyor where a plurality of conveyors is used for the transporting and laying of the concrete mix as shown and described in the above co-pending application, whereby the stream of concrete mix is maintained in substantially the same rate of flow as the mix moves on the conveyors and generally in substantially the same cross sectional form as is the stream of concrete in the conveyors, thereby avoiding the cascading of the material in batches such as is the common practice in the discharge of the concrete mix from the usual conveyor.

In the transporting and conveying of the concrete mix the belts supporting and conveying the concrete mix travel at a comparatively high rate of speed something like 500 to 600 feet per minute which imparts a considerable velocity to the stream of concrete as it is discharged from the conveyor. In transferring this stream from one conveyor to another, it is highly desirable that the stream be maintained in a constant flow if at all possible so as to avoid the separation of the large aggregates and the finer material in the mix, particularly where several conveyors are used and where it may be desirable and ofttimes is, to change the direction of flow at right angles or even as much as a complete reversal to 180° in the direction of flow. Because of the velocity imparted to the material that is discharged from one conveyor into another, it has been found quite difficult to control the material to keep larger particles of aggregate from being thrown out of the conveyor and likewise some of the other portions, and this invention has to do with the transfer and confining of the material from one conveyor to another, thus avoiding the splashing of the material as it is being transferred.

Another and further object of my invention is the confining of the material that is being transferred from one conveyor to another so as to retain the fluid portion and also the larger aggregate such as stones and the like from being thrown free of the stream and into the working parts of the conveyor and onto the workmen because the rate of travel of the material imparts a considerable velocity to the material and it is discharged with considerable force, all of which is prevented by my invention.

Another and further object of my invention is the provision of a stand which may support the last conveyor in its entirety and also the end of the conveyor discharging into the last conveyor thereby delivering the concrete mix at selected points within an area slightly in excess of 30 feet by means of removably connected chute on the stand and a splash hood over the end of the chute with the splash hood being parallel with the longitudinal axis of the receiving conveyor at all times and also with the chute end centrally positioned of the conveyor belt regardless of which direction the conveyor extends from the point where the conveyor receives the concrete mix regardless of whether the entire length of the last conveyor is used or only a partial length of it used for conveying the mix, in which case a removable stand of some sort is placed under the discharged end of the chute so as to allow for the free flow of the concrete mix therefrom.

Another and further object of my invention is the provision of a delivery chute and a removable operation hood therefor which confines the stream of concrete mix and changes the direction of flow of the mix without materially lessening the speed of travel and ultimately delivers the stream in a straight line of travel toward the discharge end of the conveyor in substantially a compact stream.

These and other objects of my invention will be more fully and better understood by reference to the accompanying drawings and in which.

Figure 1:
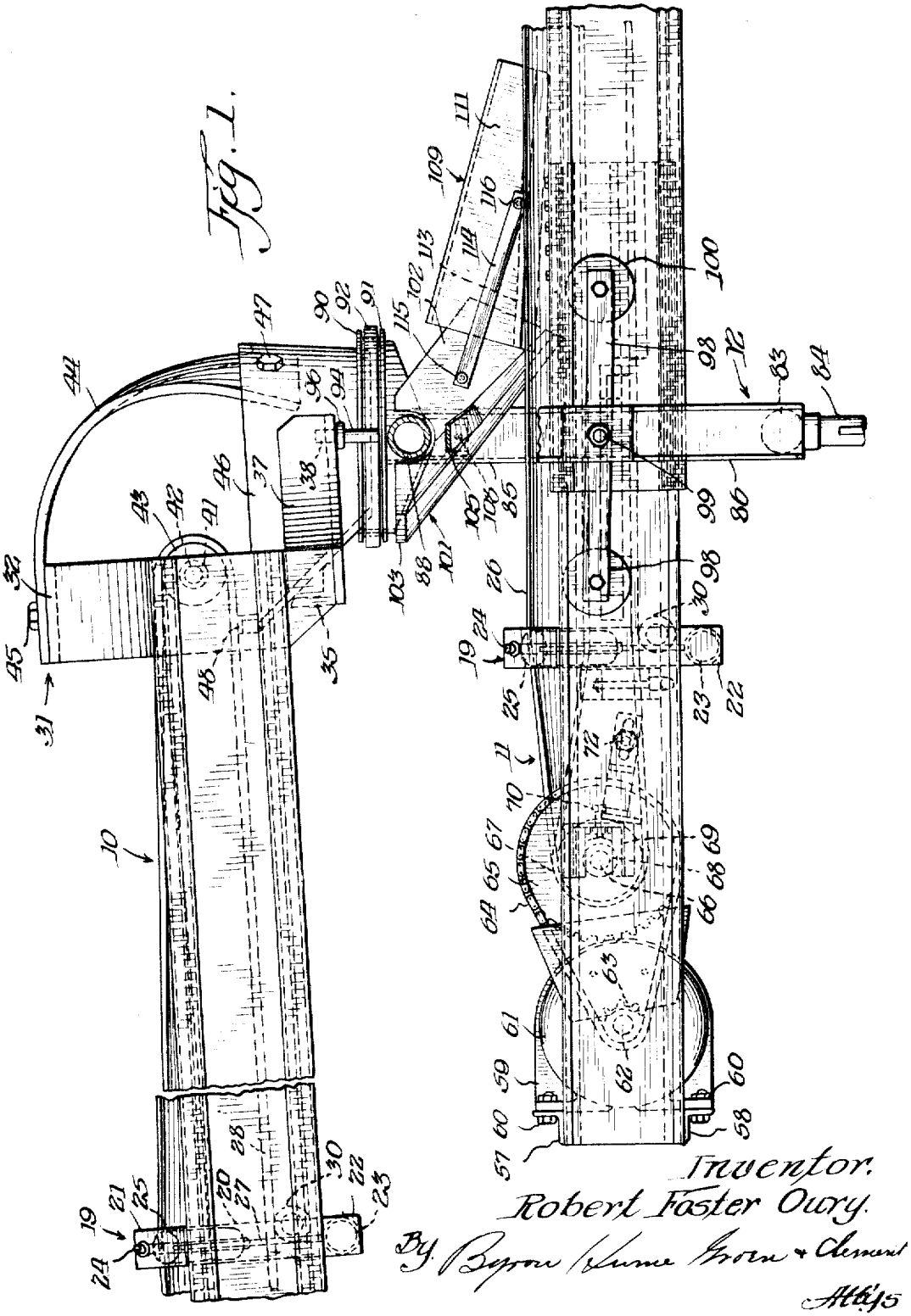
FIGURE 1 is a side elevational view of the head or discharge end of one conveyor, the tail receiving end of a second conveyor and an upper end of a supporting stand therefor with the portions of each conveyor in alined relationship.
Figure 2:
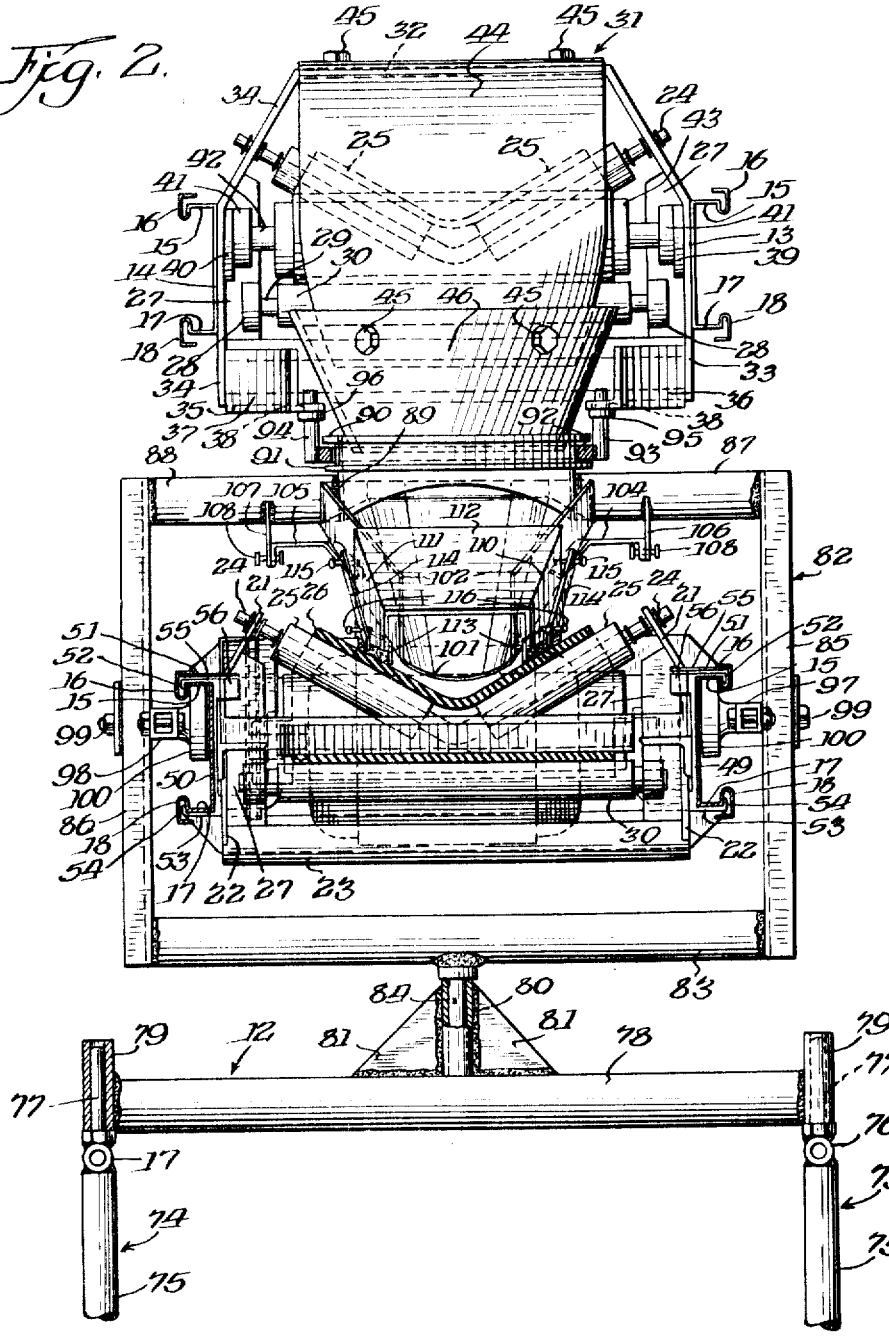
FIGURE 2 is an end elevational view of the head end of one conveyor, a part of the support stand and a sectional view of the tail end of a second in alined relation with the first conveyor.
Figure 3:
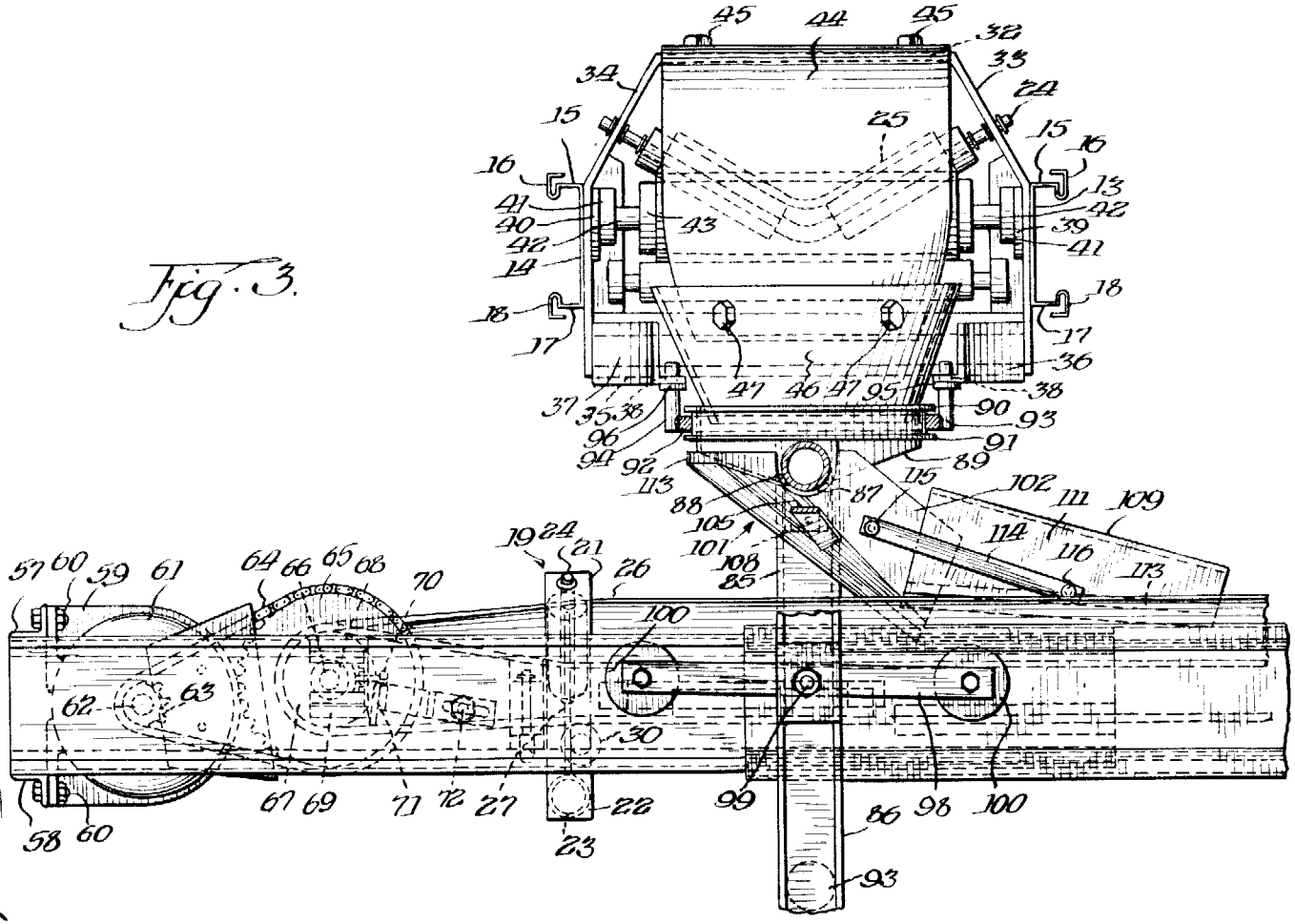
FIGURE 3 is an end elevational view of a head end of one conveyor and a side elevational view of the tail of another conveyor, the conveyors being positioned at a 90° angle with respect to each other.

Referring now specifically to the drawings and in which like reference characters refer to like parts throughout, the discharge or head end of one conveyor is indicated as a whole by 10, the tail end of the second conveyor is indicated as a whole by 11, while the stand which primarily supports the discharge end of one conveyor and bodily supports the second conveyor, is indicated as a whole as 12. The said conveyors are substantially alike in construction and consist of side rails 13 and 14, preferably in the form of a channel section having outwardly turning upper flanges 15, 15 thereon with U-shaped ribs 16, 16 along the outer edges of the flanges 15, 15 and lower flanges 17, 17 with U-shaped ribs 18, 18 on their edges which are inverted, the said side rails being composed of aluminum or other light weight metal and are approximately 30 feet in length.

Frames indicated as a whole as 19, 19 are provided which are placed in spaced relation throughout the length of each of the said conveyors except at the extreme ends and to which the side rails 13 and 14 are secured so as to hold the side rails in vertical position in spaced relation with each other. The frames 19 consist of cheek plates 20, 20 which have upper inwardly turned portions 21, 21 and lower extending portions 22, 22 which are welded or otherwise secured to cross members 23, 23, which hold the cheek plates 20, 20 together. Curved axles 24, 24 are mounted in the ends of the inwardly turned portions 21, 21 with angularly disposed rollers 25, 25 thereon which support the upper flight of an endless conveyor belt 26 which extends throughout the length of a conveyor.

The cheek plates 20, 20 have gussets 27, 27 thereon to which bearing blocks 28, 28 are secured with a roller shaft 29 mounted therein upon which rollers 30, 30 are mounted, which rollers 30, 30 support the lower flight of the endless conveyor belt 26 throughout the entire length of the conveyor as the lower flight of the belt passes through the frames 19, 19.

The head or discharge end of the conveyor has a bail indicated as a whole as 31 secured thereto, the bail comprising a top portion 32 and depending leg portions 33 and 34 extending downward therefrom against the inner faces of the side rails 13 and 14 to which the leg portions 33 and 34 of the bail are welded with the said leg portions extending downward below the lower edge of the side rails 13 and 14 and with a cross angle 35 butt welded thereto which extends transversely of the conveyor and serves to hold the outer ends of the rails 13 and 14 together, along with the bail 31. A pair of brackets 36 and 37 which are welded to the angle 35 and to the lower ends of the leg portions 33 and 34 of the bail and have openings 38, 38 therein, the said brackets 36 and 37 forming support members for the head or discharge end of the conveyor as hereinafter described.

Bearing blocks 39 and 40 are welded to the inner faces of the leg portions 33 and 34 of the bail to which bearings 41, 41 are secured, upon which a roller shaft 42 is mounted having a roller 43 thereon, which roller supports the conveyor belt 26 at the head or discharge end of the conveyor. A hood in the form of a baffle 44 is provided which is secured to the top 32 of the bail 31 by bolts 45, 45 which hood is curved longitudinally and also laterally and serves to direct the concrete mix into a funnel 46 which is secured to the hood by means of bolts 47, 47, which funnel 46 is supported on its inner side by the cross angle 35. A scraper bar 48 is provided secured at its inner ends to the legs 33 and 34 of the bail, which engages the surface of the belt 26 and removes loose concrete adhering thereto after the belt 28 passes around the roller 43.

The rear or tail end of the conveyor consists of a pair of rail sections 49 and 50 in channel form, which sections 49 and 50 have upper flanges 51, 51 thereon, each of said flanges having ribs 52, 52 along their outer edges and having lower flanges 53, 53 with ribs 54, 54 thereon with the web portions of the rails 49 and 50 being fitted in face-to-face relation with the webs of the side rails 13 and 14 and the upper flanges 51, 51 on the rail sections 49 and 50 also being fitted around the upper flanges 15, 15 on the side rails 13 and 14. The lower flanges 53, 53 on the side rails are fitted around the lower flanges 17, 17 on the side rails 13 and 14 while the ribs 54, 54 are fitted into the inverted U-shaped ribs 18, 18 on the flanges 17, 17 of the side rails 13 and 14 and so that the tail section is telescopically placed in position with the main conveyor section and adjustable longitudinally thereof. Inwardly extending plates 5, 55 are bolted to the inwardly turned ribs 16, 16 on the upper flanges 15, 15 of the side rails 13 and 14 and overlie blocks 56, 56 which are welded to the channel sections 49 and 50 at the upper sides thereof, the said blocks and the said plates having holes therethrough within which pins are placed to hold the tail section in proper longitudinal adjusted position with respect to the main section of the conveyor so as to keep the belt 26 at proper tension.

Angles 57 and 58 connect the ends of the channel sections 49 and 50 together and have a motor housing 59 secured thereto by means of bolts 60, 60 with a motor 61 having a motor shaft 62 theeron upon which a sprocket chain 64 operates, which is connected with a sprocket wheel 65, which in turn is mounted upon a shaft 66 and supports a drive roller 67 over which the belt 26 operates. The shaft 66 is mounted on bearings 68 which in turn are mounted in movable bearing blocks 69 with adjusting screws 70 therein and means by which the tension on the sprocket chain 64 is controlled.

Intermediate the ends of the channel sections 49 and 50 is a frame 19 similar to the frame 19 heretofore described with the exception that the cheek plates 20, 20 are welded to the inner faces of the channel sections 49 and 50 instead of the side rails 13 and 14 of the main section as heretofore described. A belt scraepr 71 is provided which has angularly disposed ends secured to the side rails 49 and 50 by means of bolts 72, 72 which said scraper bar forms no part of the present invention.

The stand indicated as a whole as 12 consists of two inverted U-shaped side portions 73 and 74 having legs 75, 75 forming a part thereof and connecting members 76, 76 therefor which have studs 77, 77 extending upwardly therefrom and upon which the cross member 78 is mounted, which cross member 78 has sockets 79, 79 at each of its ends which are fitted over the studs 77, 77 and which permit each of the U-shaped side supporting members of the stand to be rotated in a horizontal direction so that in placing the stand 12 in position on the forms for pouring concrete and the like, the side portions can be rotated in a plurality of directions to secure a firm footing for the stand 12.

The cross bar 78 has a socket 80 mounted thereon and supported by triangular-shaped brackets 81, 81 for the purpose of supporting a conveyor frame designated as a whole as 82 and which consists of a bottom cross member 83 which has a downwardly extending pintle 84 thereon which is fitted into the socket 80 and which permits complete and free rotation of the frame 82. The frame 82 has side members 85 and 86 which are welded to the ends of the bottom member 83, 83. Inwardly extending top members 87 and 88 are provided which are welded at their outer ends to the upper side ends of the members 85 and 86 and at their inner ends are welded to a ring member 89, which said ring member 89 has spaced circumferential flanges 90 and 91 thereon between which a ring 92 is mounted which has studs 93 and 94 thereon and welded to its outer periphery with stops 95 and 96 on the said studs which extend through the openings 38, 38 in the brackets 36 and 37 in the discharge or head end of the conveyor and fixes the position of the discharge end of the conveyor with respect to the receiving conveyor into which the material is discharged from the head section of the main conveyor.

Support arms 97 and 98 are provided which are pivotally secured to the frame members 85 and 86 by means of bolts 99, 99 and have rollers 100, 100 at each of their ends, which rollers 100, 100 in the normal operation of the main conveyor, are fitted between the upper and lower flanges 15 and 17 in the side rails 13 and 14 with the weight of the conveyor being normally sustained by the flanges 15, 15 so that the conveyor is pivotally movable about the bolts 99 as the axis, which arms 97 and 98 are the main support of the conveyor in operation although in actual use and due to the weight of the concrete mix, stands or trestles are usually used to support the discharge end of the conveyor a slight distance above the point upon which the concrete mix is being laid.

A chute 101 is provided which is preferably formed of sheet metal into proper form and has side portions 102, 102 which are notched out intermediate their ends and are fitted around the top members 87 and 88 of the frame 82 and has an arcuate shaped rear edge portion 103 which conforms in contour to the curvature of the ring *member* 89 with an arcuate shaped bottom portion of the chute, which bottom extends below the upper edges of the belt 26 so that the mixture is discharged into the central portion of the conveyor belt 26. The chute 101 is supported by brackets 104 and 105 which have in-turned ends and are welded to the sides 102, 102 of the chute and have angularly disposed outer ends which are fitted against the sides of arms 106 and 107, which arms have saddles formed therein and are welded to the cross members 87 and 88 respectively, with pins 108, 108 being inserted through the brackets 106 and 107 and through the angular disposed ends of the brackets 104 and 105 in such manner that the pins 108 may be removed so as to release the chute and remove it from the frame for convenience in inserting and removing the conveyors from the frame.

A splash hood 109 is provided which is open at each of its ends and has angularly disposed side members 110 and 111 with a top 112 and has flexible composition strips 113 along the lower marginal edges of the side members 110 and 111, which strips rest upon the belt 26 and form with the side members 110 and 111, a complete closure to prevent splashing of the material from under the hood and also the throwing out of small particles of the aggregate and the like under the hood. The splash hood is secured to the chute 101 by means of arms 114, 114, which arms are pivotally fixed to the side walls of the chute by pins 115, 115 and are secured to the side walls of the hood by means of pins 116, 116, the said hood being a suitable length up to some 24 inches, to provide adequate prevention of the splashing of the material as it is discharged onto the belt and is so mounted that the longitudinal axes on both the chute and the hood are parallel with the longitudinal axis of the belt 26 so that material is discharged in a linear direction the same as the material travels after its deposit upon the belt 26.

In operation the device is exceedingly simple in that the chute is detachably connected to the arms 106 and 107 secured to the cross member 87 of the frame and normally is pivoted about these points with its discharge end extending angularly downward to a point adjacent the belt 26, where normally the material is discharged from the chute and onto the said belt 26. The splash hood 109 is pivotally connected by the arms 114 to the chute and can be removed along with the chute in case of transfer of one of the conveyors from the frame 12 in case of removal of the apparatus from one place to another for pouring operations and can be replaced when the conveyor and stand are reassembled for operative conditions.

The material is discharged at a fairly high rate of velocity against the hood 44 because of the speed of travel of the conveyor belt, passes through the funnel 46, and ring member 89 onto the chute and onto the conveyor belt, during which process portions of the liquid material and small aggregate, as well as stones and larger pieces of aggregate, are thrown with considerable force into the chute and may rebound therefrom, but are prevented from flying off the conveyor belt because of the chute and are confined upon the belt so that rocks, debris, stones and the like are prevented from flying out against the workmen and also are prevented from getting into other operating parts of the equipment necessitating the removal therefrom to secure proper operation of the equipment.

The stream which is formed of the material on the conveyor belt is held substantially intact by the velocity imparted to it as it passes free of the conveyor belt of the first conveyor and flows in a fairly compact mass into the chute and under the hood onto the second belt because both the longitudinal axis of the chute and hood are in alignment with the longitudinal axis of the second conveyor. The change in direction of the force if the second conveyor is on an angle to the first one is accomplished as the material is in the chute, but it maintains a fairly substantial solid stream in making this transfer, which is desirable to hold the material together in as compact a form as posible until it is finally discharged at the point where the concrete is to be laid and tamped into position. In this fashion a substantially steady stream of flow is maintained from the time the mix is deposited in the initial conveyor until it is discharged from the final conveyor at its point of final disposition and tamped into final form.

While I have described more or less precisely the method employed and the apparatus used therewith, I do not wish to be understood as limiting myself thereto, as I contemplate changes in form and the proportion of parts and the substitution of equivalents as circumstances may suggest or render expedient without departing from the spirit or scope of my invention.

What I claim as new is:

1. In a concrete mix transfer apparatus the combination comprising a stand, a first conveyor substantially supported upon the said stand, a second conveyor having its discharge end supported by the said stand, a ring [shaped funnel] member mounted upon the said stand, *a funnel member extending into the ring member,* an inclined chute mounted under the [ring shaped] funnel member upon the said stand at one of its ends and terminating adjacent the conveyor belt on the first mentioned conveyor, and a fixed hood in the discharge end of said second mentioned conveyor having a curved wall whereby the concrete mix received from the said second conveyor is directed downward and into the said funnel *member* in a substantially solid stream.

2. In a concrete mix transfer apparatus the combination comprising a stand, a first conveyor substantially supported upon the said stand, a second conveyor having its discharge end supported by the said stand, a ring [shaped funnel] member mounted upon the said stand, *a funnel member extending into the ring member,* an inclined chute mounted under the [ring shaped] funnel member upon the said stand at one of its ends and terminating adjacent the conveyor belt on the first mentioned conveyor, and a fixed hood in the discharge end of said second mentioned conveyor having a curved wall whereby the concrete mix received from the said second conveyor is directed downward and into the said funnel *member* in a substantially solid stream.

3. In a concrete mix transfer apparatus the combination comprising a stand forming a main support for a first conveyor, a second conveyor for discharging to the said first mentioned conveyor, a ring member mounted on said stand forming a support for the discharge end of said second conveyor, a fixed curved hood adjacent the discharge end of the said second conveyor, a funnel member at the lower end of the said fixed hood extending into the ring member, an inclined chute means connected to the said stand mounted under the said funnel member having its discharge end adjacent to and extending along the path of said first conveyor for receiving the concrete mix from said curved hood and depositing the concrete mix upon said first receiving conveyor, and an open bottom splash hood pivotally connected to the said inclined chute means.

4. In a concrete mix transfer apparatus the combination comprising a stand, a ring member on said stand, a receiving conveyor substantially supported upon said stand, a funnel member *extending into the ring member* [positioned above said receiving conveyor] , a discharging conveyor having a discharge end portion supported on said ring member, baffle means for directing the concrete mix into said funnel member from said discharging conveyor, and a removable inclined chute means mounted under said funnel member upon the said stand extending longitudinally along the path of and terminating adjacent to said receiving conveyor for receiving the concrete mix passing through said funnel member and feeding the concrete mix onto said receiving conveyor.

5. In a concrete mix transfer apparatus the combination comprising a stand, a ring member supported by said stand, a discharge conveyor having a discharge end portion connected to said ring member, a receiving conveyor movable relative to said discharging conveyor, a funnel member *extending into the ring member* [mounted for receiving the concrete mix], hood means for directing the concrete mix into said funnel member from said discharging conveyor, and an inclined chute means mounted under the funnel member and extending over the longitudinal path of said receiving conveyor for feeding the concrete mix onto said receiving conveyor.

6. The concrete mix transfer apparatus of claim 5 further characterized by a scraper member engaging said discharging conveyor, and said funnel member extending under said scraper member.

*7. Concrete mix transfer apparatus comprising:*

*a stand;*

*a first conveyor;*

*a second conveyor;*

*means, including a pair of rotatable connections,*

*mounting the first conveyor and the discharge end of the second conveyor on the stand whereby the first and second conveyors are independently rotatable about a vertical axis;*

*an inclined chute mounted on the stand at one of its ends beneath the discharge end of the second conveyor and terminating adjacent the first conveyor; and*

*baffle means in the discharge end of the second conveyor extending substantially above the said discharge end,*

*whereby concrete mix received from the second conveyor is directed downwardly and onto the inclined chute in a substantially solid stream.*

*8. Concrete mix transfer apparatus, as claimed in claim 7, and further comprising an open bottom splash hood having a closed top, the said splash hood being connected to the inclined chute and forming therewith a tunnel for the passage of concrete mix from the inclined chute to the first conveyor.*

*9. Concrete mix transfer apparatus, as claimed in claim 7, and further comprising funnel means mounted on the stand for receiving concrete mix from the baffle means and for directing it onto the inclined chute.*

*10. Concrete mix transfer apparatus, as claimed in claim 7, wherein the baffle means comprises a fixed hood having a curved wall.*

References Cited

The following references, cited by the Examiner, are of record in the patented file of this patent or the original patent.

UNITED STATES PATENTS

| | | | |
|---|---|---|---|
| 832,714 | 10/1906 | Bergert | 198—45 |
| 2,045,532 | 6/1936 | Merwin | 259—169 |
| 2,785,683 | 3/1957 | Davidson | 198—45 |
| 2,800,991 | 7/1957 | Manierre | 198—5 |
| 2,988,203 | 6/1961 | Peterson | 198—213 |
| 3,003,611 | 10/1961 | Pelzer | 119—100 |

FOREIGN PATENTS

| | | |
|---|---|---|
| 343,335 | 7/1934 | Canada. |
| 1,009,995 | 3/1952 | France. |
| 882,668 | 7/1953 | Germany. |
| 882,673 | 7/1953 | Germany. |
| 913,516 | 6/1954 | Germany. |
| 825,769 | 12/1959 | Great Britain. |

RICHARD E. AEGERTER, *Primary Examiner.*

EVON C. BLUNK, *Examiner.*